Patented Dec. 18, 1951

2,578,976

UNITED STATES PATENT OFFICE 2,578,976

METHOD OF COATING INGOT MOLDS AND COMPOSITION THEREFOR

Frank Ingala, Chicago, Ill.

No Drawing. Application July 2, 1949,
Serial No. 102,931

7 Claims. (Cl. 22—189)

1

The present invention relates to a method of coating a permanent mold for the reception of molten metals having high melting points and to a composition for application to such molds. More particularly, the present invention relates to a composition for application to the interior surfaces of a metal mold employed for the casting of steel and the like articles and to a method of coating metal molds with such compositions.

The instant application is a continuation-in-part of my earlier filed copending application entitled "Method of Treating Steel Ingot Molds," Serial No. 739,249, filed April 3, 1947, now abandoned.

During the casting of steel ingots within a metal mold, molten steel is splashed onto the sides of the mold during pouring of the metal, the splashed metal solidifying before the remainder of the ingot. The splashed metal on the sides of the mold produces scabs on the surface of the ingot which may appear in the final product as marks, slivers, or seams, the solidified splashes also giving rise to strains which tear the outer surface of the ingot during solidification of the same. In addition to these difficulties, the solidified splashed metal remains on the interior surfaces of the mold following stripping of the ingot therefrom, thus necessitating careful and laborious cleaning and reconditioning of the mold prior to its again being employed for the casting of an ingot.

Due to these difficulties as above outlined, it has been proposed that the interior surfaces of the mold be coated prior to the introduction of molten metal thereinto to prevent the adherence of molten metal splashes to the interior mold surfaces. In this connection it has been proposed that tar or pitch coatings or even sugar be applied to the interior surfaces of the mold. However, these expedients have not solved the problem due to the burning or charring of the coating material, the extremely deleterious and unhealthy odors which are evolved upon charring, and the necessity of drastically cooling the mold prior to pouring so that the coating will adhere to the mold inner surfaces.

The present invention now provides an improved mold coating composition and method of coating a mold which eliminates the disadvantages above set forth. The coating composition may be applied to the mold at an elevated temperature, thus eliminating the necessity of further cooling the mold after stripping and prior to a second pouring. Also, the coating composition adheres to the inner mold wall surfaces, and little

2 or no charring of the composition occurs at temperatures up to about 900° F. The composition is readily employed, and is merely blown into the mold under fluid pressure to coat the interior surfaces thereof, and the composition is extremely stable to both temperature and moisture, thus greatly enhancing its use under actual pouring conditions.

The coating composition of the present invention includes a farinaceous or starch material, preferably potato starch or other starch having a moisture content of less than 15%; an organic bonding material, such as a resin or gum having a melting point (capillary tube method) of greater than 200° F.; and a drying and heat-resistant agent, such as an inorganic calcium composition, e. g., calcimine, lime, calcium carbonate, or calcium sulfate.

It is, therefore, an important object of the present invention to provide a composition for coating the inner surfaces of a metal mold containing a starchy material, an organic binding agent, and a drying and heat-resistant agent.

It is another important object of the present invention to provide an improved method of coating the interior surfaces of a metal mold at an elevated temperature by the application thereto of a composition containing a starchy material, an organic bonding agent, and a drying and heat-resistant agent.

A further important object of the present invention is to provide an improved composition for coating the inner surfaces of a metal mold for casting steel and the like metal including a starchy material containing less than about 15% moisture, a resin, and a calcium composition.

Still another important object of the present invention is to provide an improved method for coating a metal mold for casting a steel and the like which maintains the mold at an elevated temperature by applying to the inner surfaces of the mold a small amount of a coating composition containing a starchy material having a moisture content of less than about 15%, a resin, and a calcium composition.

Other and further important objects of the present invention will become apparent from the following description and the appended claims.

As hereinbefore disclosed, the present invention contemplates the employment of a mold coating composition including a starchy material, an organic bonding agent, and a drying and heat-resisting agent.

The preferred compositions of the present invention contain starchy or farinaceous material containing less than about 15% moisture. For this reason, I prefer to employ potato starch, which contains about 14% moisture, although other starches such as soya bean starch, tapioca starch, or other forms of starch may be employed, provided the moisture content is maintained below about 15%.

With respect to the organic bonding agent, I prefer to employ a resin or gum, particularly the lightcolored wood or gum rosins having melting points of more than about 200° F. The heat-resistant and drying agent is preferably selected from the group of lime, calcium carbonate, calcium sulfate, or calcimine, which is a finely divided mixture of animal glue and calcium carbonate. Calcimine is commercially available in varying compositions containing varying amounts of ingredients and varying grades of glue. Any of the commercially available forms of calcimine are suitable for use with the present invention.

For each 1 part by weight of starchy material I may employ from 0.1 to 1.5 parts by weight of bonding agent and from 0.1 to 2.5 parts by weight of drying and heat-resisting agent. The preferred range of ingredients is from 70 to 30% starchy material, 12 to 20% bonding agent, and 15 to 50% drying and heat-resisting agent. As a single preferred composition I may employ 65% potato starch, 20% rosin, and 15% calcimine.

To prepare the coating composition, the dry weight of bonding agent and starchy material are mixed and passed several times through a screen of approximately 350 mesh, the powdered drying and heat-resisting agent is added, and the material is passed several times through a screen of approximately 450 mesh in order that all lumps may be removed from the coating composition.

The material may be applied to the interior surfaces of an ingot mold or other type of mold by any suitable means, preferably by blowing the composition in powdered form and under air pressure into the mold. Upon contacting the heated interior mold wall, the resin or similar binder melts and/or softens and adheres to the wall to bind the remainder of the composition thereto. I have found that the composition may be advantageously applied to a mold maintained at temperatures as high as from 700 to 900° F. with a preferred temperature range being from 150 to 550° F. and optimum results being obtained at a temperature of approximately 350° F.

The theory upon which the improved results of the present invention may be predicated is not conclusively known but it is believed that it is due to the prevention of adhesion of molten metal to the mold and the slowing in the rate of cooling of the steel so that there is less tendency for the ingot to form surface defects during cooling. In addition, the stripping of the resulting ingot from the mold is improved, and a clean mold results from the stripping operation with a considerable saving in time and labor previously necessary to clean the molds.

The function to be ascribed to each of the ingredients is also not definitely known. The starch lends strength to the coating, and the resin serves as a binder or bonding agent causing the material to adhere well to the mold walls, and further prevents the wetting or adhesion of molten steel to the sides of the mold. The calcimine, lime, or other calcium composition lends added heat resistance to the coating composition and also serves as a drying agent to permit the storage of the coating composition under adverse temperature and moisture conditions, such as are encountered in actual pouring practice, without the formation of lumps.

As exemplary of the improved results obtained by the use of my composition, the following examples are presented:

Example I

A coating composition containing the following ingredients was prepared:

| | Per cent |
|---|---|
| Potato Starch | 65 |
| Rosin | 20 |
| Calcimine | 15 |
| Total | 100 |

To prepare the composition, the resin and potato starch were thoroughly mixed and screened three times through a screen of 350 mesh. The calcimine was added to the screened resin and starch composition, the complete composition being screened two times through a screen of 450 mesh.

The composition was applied to the interior mold surfaces of an ingot mold of conventional type by blowing under air pressure, the mold being maintained at a temperature of 350° F. Molten steel was introduced into the mold and cooled therein to form an ingot. The ingot was stripped from the mold, a substantial decrease in surface defects was noted, and the mold following stripping was clean.

Example II

A second coating composition was prepared having the following composition:

| | Per cent |
|---|---|
| Potato starch | 50 |
| Rosin | 15 |
| Calcimine | 35 |
| Total | 100 |

The composition was prepared in the same manner as that of Example I, and comparable results were obtained upon casting an ingot in a mold having the coating composition of this example applied to the inner surfaces thereof.

Example III

A coating composition having the following composition was prepared:

| | Per cent |
|---|---|
| Potato starch | 60 |
| Rosin | 15 |
| Calcimine | 25 |
| Total | 100 |

The composition was prepared as in Example I, and comparable results in casting were obtained.

Example IV

A coating composition having the following composition was prepared:

| | Per cent |
|---|---|
| Potato starch | 33 |
| Rosin | 17 |
| Powdered lime | 50 |
| Total | 100 |

The composition was prepared as in Example I, and comparable results in casting were obtained.

Example V

A coating composition having the following composition was prepared:

|  | Per cent |
|---|---|
| Potato starch | 30 |
| Rosin | 20 |
| Powdered lime | 50 |
| Total | 100 |

The composition was prepared as in Example I, and comparable results in casting were obtained.

The following actual results were obtained in commercial scale steel ingot casting:

Standard 105.5 tons cf SAE 4140 alloy steel ingots were cast in 26-inch diameter ingot molds, the average weight of each ingot being 11,080 pounds. 57.6 tons were produced using about 1 pound per mold of my novel composition of Example I, while 47.9 tons of ingots were produced using a conventional mold coating consisting of tar.

The ingots were rolled and cut into billets from which surface defects were removed by means of a chisel or a torch to condition the billets. Twenty man hours were required to condition the billets rolled from the 57.6 tons of steel cast with my novel mold coating composition, while twenty-five man hours were required to condition the billets prepared by rolling the 47.9 tons of steel cast in molds coated with tar. In other words, when my coating composition was used, 23 tons of steel were conditioned in each man turn (two men working for eight hours), while in the case of steel cast in molds coated with tar, 15.6 tons of steel were conditioned for each man turn. Further, the per cent of material rejected (removed because defective) amounted to 0.93% when my mold coating composition was used, and up to 4.74% when tar was used to coat the molds.

In another series of castings using 8640 alloy steel, 55.5 tons of ingot were produced using my mold coating composition and 39.3 tons using tar. In the conditioning of the billets rolled from these ingots, practically no material had to be removed for defects from steel ingots cast in molds coated with my composition, while 1.68% of the steel had to be removed from ingots cast in tar-coated molds.

Similar results were obtained in the casting of 8637 alloy steel.

It will be understood that modifications and variations may be effected without departing from the scope of the novel concepts of the present invention.

I claim as my invention:

1. A dry, finely divided composition for coating the inner surfaces of a heated mold for casting steel and the like consisting essentially of 70 to 30% by weight of a starchy material having a moisture content of less than 15%, 12 to 20% by weight of a resin having a melting point of more than 200° F., and 15 to 50% by weight of a drying and heat-resistant agent selected from the group consisting of calcimine, lime, calcium carbonate, and calcium sulfate.

2. A dry, finely divided composition for coating the inner surfaces of a heated mold for casting steel and the like consisting essentially of 70 to 30% by weight of potato starch, 12 to 20% by weight resin, and 15 to 50% by weight calcimine.

3. A dry, finely divided composition for coating the inner surfaces of a heated mold for casting steel and the like consisting essentially of 65% by weight of potato starch, 20% by weight resin, and 15% by weight calcimine.

4. The method of coating a metal mold for the casting of molten metal which comprises applying to the inner surfaces of the mold while retained at a temperature in excess of 150° F. a coating composition consisting essentially of 70 to 30% by weight of a starchy material containing less than 15% moisture, 12 to 50% by weight of a resin having a melting point of more than 200° F., and 15% to 50% by weight of a drying and heat-resistant agent selected from the group consisting of calcimine, lime, calcium carbonate, and calcium sulfate.

5. The method of coating a metal mold for the casting of steel or the like which comprises maintaining the mold at an elevated temperature of less than about 900° F. and blowing onto the inner surfaces of the mold under air pressure a small amount of a dry, finely divided powder consisting essentially of 70 to 30% by weight of a starchy material containing less than 15% water, 12 to 20% by weight of an organic resin having a melting point of greater than 200° F., and 15 to 50% by weight calcimine.

6. The method of coating a metal mold for casting steel and the like which comprises maintaining said mold at a temperature of between 150 and 550° F. and blowing onto the inner surfaces of the mold under air pressure a small amount of dry, finely divided powder consisting essentially of 70 to 30% potato starch, 12 to 20% resin, and 15 to 50% calcimine.

7. The method of coating a metal mold for casting steel and the like which comprises maintaining said mold at a temperature of between 150 and 550° F. and blowing onto the inner surfaces of the mold under air pressure a small amount of a dry, finely divided powder consisting essentially of 65% potato starch, 20% resin, and 15% calcimine.

FRANK INGALA.

REFERENCES CITED

The following references are of record in the file of this patent:

UNITED STATES PATENTS

| Number | Name | Date |
|---|---|---|
| 191,974 | Jones | June 12, 1877 |
| 309,629 | Kinsley | Dec. 23, 1884 |
| 335,628 | Riddle | Feb. 9, 1886 |
| 482,901 | Gordon | Sept. 20, 1892 |
| 840,251 | Pinkus | Jan. 1, 1901 |
| 1,978,948 | Kennedy | Oct. 30, 1934 |
| 2,234,152 | Archer | Mar. 4, 1941 |

FOREIGN PATENTS

| Number | Country | Date |
|---|---|---|
| 364,607 | France | June 6, 1906 |
| 529,753 | France | Sept. 15, 1921 |